United States Patent [19]

Pelton

[11] 4,357,004
[45] Nov. 2, 1982

[54] APPARATUS FOR REFINING MOLTEN METAL

[75] Inventor: John F. Pelton, Yorktown Heights, N.Y.

[73] Assignee: Union Carbide Corporation, Danbury, Conn.

[21] Appl. No.: 280,699

[22] Filed: Jul. 6, 1981

[51] Int. Cl.³ .............................................. C22B 9/00
[52] U.S. Cl. ..................................... 266/225; 285/41; 285/158; 75/68 R; 75/93 E
[58] Field of Search ............. 266/225; 75/68 R, 93 E; 285/41, 158

[56] References Cited

U.S. PATENT DOCUMENTS 3,045,997  7/1962  Hudson .............................. 266/225
3,743,263  7/1973  Szekely .............................. 266/225

Primary Examiner—L. Dewayne Rutledge
Assistant Examiner—Christopher W. Brody
Attorney, Agent, or Firm—Saul R. Bresch

[57] ABSTRACT

Apparatus for refining molten metal comprising a vessel, a rotor, and a stator having a graphite/metal joint above the vessel cover wherein said joint is provided with cooling passages and wherein cross-sectional and distance relationship are established between parts of the joint, the joint and the cover, and the cooling passages and the cover.

2 Claims, 2 Drawing Figures

APPARATUS FOR REFINING MOLTEN METAL

FIELD OF THE INVENTION

This invention relates to apparatus for refining molten metal.

DESCRIPTION OF THE PRIOR ART

Although the invention described herein has general application in refining molten metals, it is particularly relevant in refining aluminum, magnesium, copper, zinc, tin, lead, and their alloys and is considered to be an improvement over the apparatus described in U.S. Pat. No. 3,743,263 issued July 3, 1973, which is incorporated by reference herein.

Basically, the process carried out in the reference apparatus involves the dispersion of a sparging gas in the form of extremely small gas bubbles throughout a melt. Hydrogen is removed from the melt by desorption into the gas bubbles, while other non-metallic impurities are lifted into a dross layer by flotation. The dispersion of the sparging gas is accomplished by the use of rotating gas distributors, which produce a high amount of turbulence within the melt. The turbulence causes the small non-metallic particles to agglomerate into large particle aggregates which are floated to the melt surface by the gas bubbles. This turbulence in the metal also assures thorough mixing of the sparging gas with the melt. Non-metallic impurities floated out of the metal are withdrawn from the system with the dross while the hydrogen desorbed from the metal leaves the system with the spent sparging gas.

The rotating gas distributor is made up of a shaft with a rotor on one end and drive means on the other. Surrounding this shaft for most of its length is a hollow sleeve or housing called a stator, which is attached to the apparatus. As the name stator implies, this piece does not move. Process gas passes through the space between the interior stator wall and the shaft. The stator typically comprises an upper steel portion and a lower graphite portion having a mechanical connection such as a threaded joint, which, in addition to linking the two portions, provides a gas seal. Graphite is used for the lower portion because it is an easily fabricated material that is resistant to molten aluminum and to the halide gases and fluxes that might be used in the refining zone. The upper portion is made of steel in order to provide structural support.

While graphite is resistant to the materials and temperatures that exist in the refining zone, it is not resistant to oxidation from air at these temperatures, which are typically about 700° C. On the other hand, the steel portion is more resistant to air oxidation than is the graphite, but it is not at all resistant to molten aluminum. These conditions suggest that the joint between the graphite and steel lie within the zone of the cover, since this is where conditions are suitable for both materials. This is due to the cover being insulated to reduce heat loss, the insulation giving the cover considerable thickness. The steel/graphite joint, was, therefore, located in this insulated zone. Although the graphite, with its relatively high thermal conductivity, will still be at a high enough temperature to oxidize at a fast rate in air, the air is effectively excluded by the combination of the close fit of the cover around the joint and the fact that thermal convection causes inert gas from the refining zone to flow upward through any available space between the stator and the cover. The steel portion does not get hot enough, where it is exposed to air, to oxidize severely.

This arrangement is convenient and works well as long as the process gas contains only inert gases. However, when chlorine is present, as it must be in some refining procedures, there is a severe attack on the steel portion of the joint. The temperature is high enough here to volatilize the iron chloride which is formed and this volatile material is carried away. Thus, portions of the steel section, including threads, simply disappear. Seals to isolate these areas from the process gas have been found ineffective here especially since practical grades of graphite are porous and the small amount of gas that flows through the graphite is sufficient to damage the steel part. When the metal part is made of a corrosion resistant alloy, the corrosion products formed in the threaded area are not volatile. As these corrosion products increase in thickness, they eventually cement the graphite in place. In this case, the joint cannot be easily disassembled to perform the necessary graphite replacement. Also, the seating shoulder is found to be so pitted with corrosion that it will not form an effective gas seal.

SUMMARY OF THE INVENTION

An object of this invention, therefore, is to provide an improvement in apparatus for refining molten metal, particularly with relation to the stator joint, whereby the destructive effort of chlorine is countered.

Other objects and advantages will become apparent hereinafter.

According to the present invention such an improvement has been discovered in an apparatus for refining molten metal comprising, in combination:

(a) a vessel having an insulated cover, at least one inlet zone and at least one outlet zone, and at least one refining compartment connected thereto; and (b) one rotating gas distributing device disposed in each refining compartment, said device comprising (i) a shaft passing through the cover and having drive means at its upper end located above the cover outside of the compartment and a rotor fixedly attached to its lower end located below the cover inside of the compartment and (ii) a hollow stator surrounding said shaft and fixedly attached to said vessel, the stator and shaft having a common hypothetical axis, said stator having an upper portion and a lower portion, the upper portion comprised of a corrosion resistant metal and the lower portion comprised of graphite, the upper portion being connected to the lower portion by a corrosion resistant metal/graphite threaded joint, the cover being at least about 5 inches thick in the vicinity of the stator.

The improvement comprises:

(A) providing a joint which comprises a threaded male graphite piece having a shoulder preceding the threads and a threaded female corrosion resistant metal piece, the female piece being seated against the shoulder of the male piece and the cross-sectional area of the female piece, as measured immediately adjacent to the shoulder, being in the range of about 30 percent to about 50 percent of the cross-sectional area of the unthreaded section of the graphite portion as measured immediately adjacent to the shoulder;

(B) providing an annular passage in the unthreaded section of the corrosion resistant metal portion through which a cooling gas can be passed, at least part of said passage being located perpendicular to the axis and proximate to the joint at a distance therefrom about equal to the thickness of the wall of the female piece in which the threads are cut and having an effective cooled area of at least about 70 percent of the cross-sectional area of the unthreaded section of the graphite portion as measured immediately adjacent to the shoulder;

(C) establishing a ratio of (i) the distance from the side of the cover adjacent to the refining compartment to the side of the joint closest to the cover to (ii) the thickness of the cover, said ratio being greater than unity; and (D) establishing a ratio of (i) the distance from the surface of the annular passage closest to the shoulder to the shoulder to (ii) the distance from the side of the cover adjacent to the refining compartment to the side of the joint closest to the cover, said ratio being no greater than about 0.35:1.

Note: The "cross-sectional area of the female piece" and the "thickness of the wall of the female piece" are measured exclusive of the threads. Thus, dimension E is shown in FIG. 2 to run from the base of the threads outward to delineate the thickness of the wall.

DESCRIPTION OF THE PREFERRED EMBODIMENT

Figure 1:
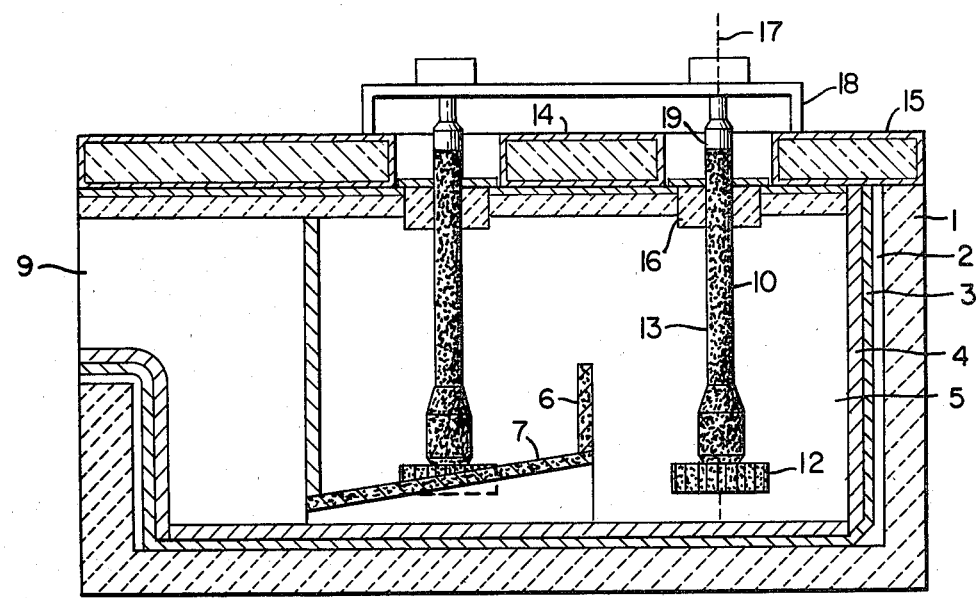
FIG. 1 is a schematic diagram of a side view of a cross-section of subject apparatus absent the detail of the joint and cover.

Referring to the drawing:

FIG. 1 shows most of the parts of one embodiment of the overall apparatus: refractory vessel 1, heating elements 2, cast iron shell 3, graphite plates 4, refining compartments 5, baffle 6, exit tube 7, an inlet zone (not shown) behind outlet zone 9, rotating gas distributors 10, rotors 12, stators 13, insulated cover sections 14 and 15, and insulated cover section 16. A shaft (not shown) passes through stator 13, the shaft and stator 13 having a common hypothetical axis 17, and is attached to rotor 12. The shaft is also connected to drive means such as a motor (not shown) at its upper end. Stator 13 is attached to steel structure 18, which, in turn, is attached to insulated cover sections 14 and 15. Insulated cover sections 14 and 15 are hollow steel structures filled with high temperature insulation and having insulating refractory fastened to the bottom while insulated cover section 16 is a steel plate with insulating refractory fastened to the bottom. Stator 13 is constructed in two parts connected at joint 19. The lower part of stator 13 is made of graphite while the upper part has a lower corrosion resistant metal section and an upper section of ordinary steel. The lower corrosion resistant metal section makes up the female portion of joint 19. Materials which can be used as the high temperature insulation are ceramic fiber blankets and as the insulating refractory, rigidized ceramic fiber board. The thickness of cover section 16 is at least about 5 inches. While there is technically no upper limit to the thickness, a practical limit is about 10 inches.

Figure 2:
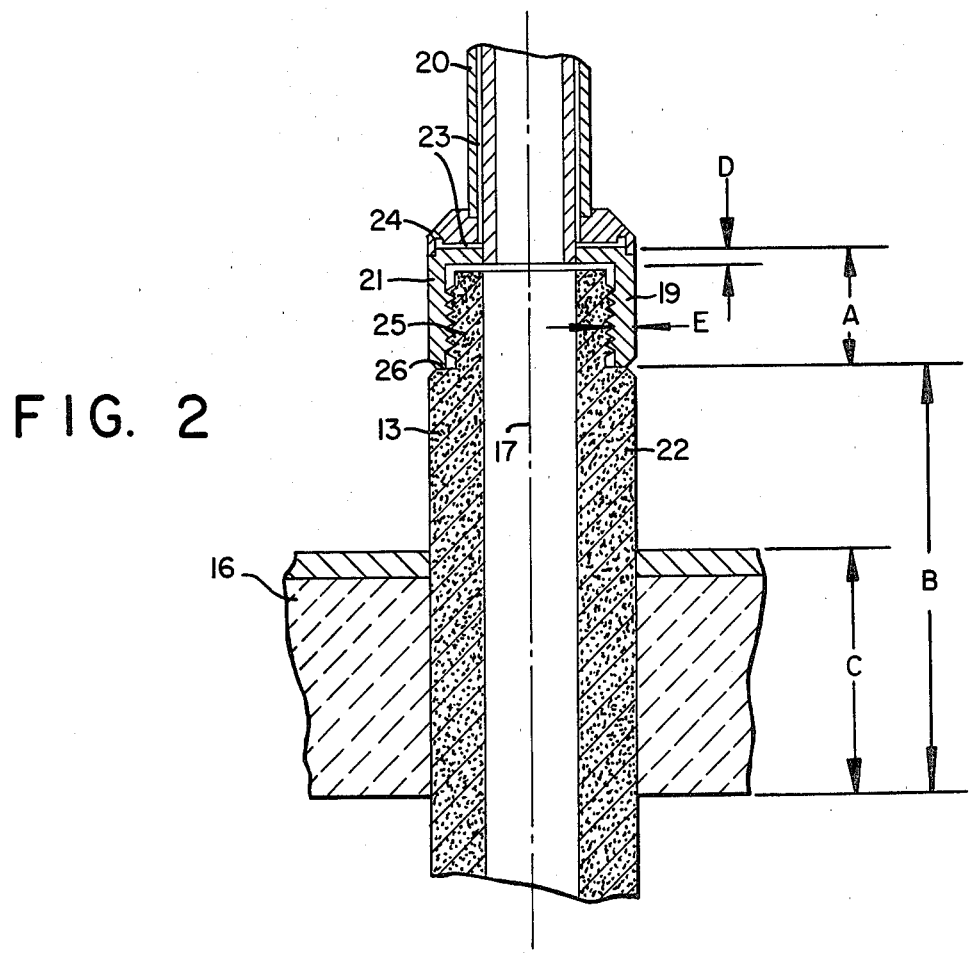
FIG. 2 is a schematic diagram in detail of a center cross-section of the improvement without the surrounding apparatus or the shaft.

FIG. 2 shows a section of FIG. 1 in detail. The section includes a portion of stator 13 with joint 19 and a portion of insulated cover 16. The shaft is omitted, but hypothetical axis 17 is present. Stator 13 comprises steel portion 20, corrosion resistant metal portion 21, and graphite portion 22. The threaded female piece of joint 19 corresponds to corrosion resistant metal portion 21. Graphite portion 22 includes threaded male piece 25 and shoulder 26 against which the threaded female piece is seated. There is a gap between the top of graphite portion 22 and the interior end of the female piece to make certain that the contact surface is always on shoulder 26.

Annular passage 23 follows a right angle, first passing parallel to axis 17 and then perpendicular to axis 17 at a point very close to the threaded connection. Exit holes 24 are drilled through the steel wall to an enlarged end of passage 23. Cooling gas such as air or nitrogen, under pressure, is sent through passage 23 to provide what is called an "effective cooled area", which serves to cool threaded graphite male piece 25. This effective cooled area is the lower surface of the section of passage 23, which runs perpendicular to axis 17. This surface lies a short distance from the portion of the threaded female piece of joint 19, which is adjacent to the gap and the upper end of threaded male piece 25. The distance is about equal to the thickness of the threaded wall of corrosion resistant metal portion 21. i.e., dimension D (the thickness of the metal) is about equal to dimension E. Here, the term "about" can mean plus or minus 25 percent, but preferably is limited to plus or minus 10 percent.

AISI type 330 stainless steel is particularly desirable for corrosion resistant metal portion 21 because it combines the properties of being more resistant to high temperature chlorine attack than most other stainless steel grades and has a higher thermal conductivity than most other corrosion resistant stainless steels thus reducing the operating temperature of joint 19 and the exposed graphite below it. The upper part of stator 13 is divided into an ordinary steel portion 20 and corrosion resistant metal portion 21 in the interest of economy, i.e., the relatively expensive corrosion resistant metal is limited to the area of joint 19 where the chance of high temperature exposure to the corrosive effect of chlorine is the greatest and where corrosion would do the most damage. Other conventional corrosion resistant metals are contemplated particularly those which are resistant to chlorine such as Hastelloy B. If necessary, the corrosion resistant metal portion should be extended upward to avoid any corrosion. Any conventional metal having sufficient strength to hold up under process conditions can be substituted for the steel in steel portion 20.

A short distance above insulated cover 16, graphite portion 22 changes dimensions to provide shoulder 26 upon which piece 21 can rest. The threads of threaded piece 25 begin at shoulder 26. The cross-sectional area of stainless steel portion 21, which is of interest here, is that which is seated against shoulder 18, i.e., the area between the base of the threads and the outer margin of portion 21 (one of its dimensions is dimension E). This cross-sectional area is at least about 30 percent of the cross-sectional area of the unthreaded part of graphite portion 22 as measured immediately adjacent to shoulder 26. This area, of course, does not include the hollow center of stator 13. A practical cross-sectional area of piece 21 is in the range of about 30 percent to about 50 percent.

The "effective cooled area" is the lower surface of the portion of annular passage 23 which is perpendicular to axis 17. This portion of the passage 23 can also be described as a radial horizontal passage. This effective cooled area should be at least about 70 percent of the cross-sectional area of the unthreaded part of graphite porton 22 as measured immediately adjacent to shoulder 26, and preferably has an area in the range of about 70 percent to about 100 percent of same. As a caution, it should be noted that water cooling cannot be substituted for gas cooling because of the hazards involved. A practical height for the portion of annular passage 23 mentioned in this paragraph is about 0.30 inch to about 0.60 inch.

The ratio of the distance from the side of the cover adjacent to the refining compartment to the side of the joint closest to the cover (dimension B) to the thickness of the cover (dimension C) is greater than unity. There is no upper limit except the bounds of practicality, but the ratio is usually no greater than 2:1. The ratio of the distance from the surface of annular passage 23 closest to shoulder 26 to shoulder 26 (dimension A) to the distance from the side of the cover adjacent to the refining compartment to the side of the joint closest to the cover (dimension B) is no greater than about 0.35:1 and is preferably no less than 0.2:1.

For a refining compartment having the approximate dimensions of 30 inches in length, 24 inches in width, and 34 inches in height, typical stator and cover dimensions are in the following range:

| dimension (see FIG. 2) | range (in inches) |
|---|---|
| A | 2 to 3 |
| B | 8 to 11 |
| C | 5 to 7 |
| D | 0.3 to 0.5 |
| E | 0.3 to 0.5 |
| diameter of stator at shoulder 26 | 4 to 5 |

I claim:

1. In an apparatus for refining molten metal comprising, in combination:
    (a) a vessel having an insulated cover, at least one inlet zone and at least one outlet zone, and at least one refining compartment connected thereto; and
    (b) one rotating gas distributing device disposed in each refining compartment, said device comprising (i) a shaft passing through the cover and having drive means at its upper end located above the cover outside of the compartment and a rotor fixedly attached to its lower end located below the cover inside of the compartment and (ii) a hollow stator surrounding said shaft and fixedly attached to said vessel, the stator and shaft having a common hypothetical axis, said stator having an upper portion and a lower portion, the upper portion comprised of corrosion resistant metal and the lower portion comprised of graphite, the upper portion being connected to the lower portion by a corrosion resistant metal/graphite threaded joint, the cover being at least about 5 inches thick in the vicinity of the stator, the improvement comprising
    (A) providing a joint which comprises a threaded male graphite piece having a shoulder preceding the threads and a threaded female corrosion resistant metal piece, the female piece being seated against the shoulder of the male piece and the cross-sectional area of the female piece, as measured immediately adjacent to the shoulder, being at least about 30 percent of the cross-sectional area of the unthreaded section of the graphite portion as measured immediately adjacent to the shoulder;
    (B) providing an annular passage in the unthreaded section of the corrosion resistant metal portion through which a cooling gas can be passed, at least part of said passage being located perpendicular to the axis and proximate to the joint at a distance therefrom about equal to the thickness of the wall of the female piece in which the threads are cut and having an effective cooled area of at least about 70 percent of the cross-sectional area of the unthreaded section of the graphite portion as measured immediately adjacent to the shoulder;
    (C) establishing a ratio of (i) the distance from the side of the cover adjacent to the refining compartment to the side of the joint closest to the cover to (ii) the thickness of the cover, said ratio being greater than unity; and
    (D) establishing a ratio of (i) the distance from the surface of the annular passage closest to the shoulder to the shoulder to (ii) the distance from the side of the cover adjacent to the refining compartment to the side of the joint closest to the cover, said ratio being no greater than about 0.35:1.

2. The apparatus defined in claim 1 wherein the cross-sectional area of the female piece, referred to in (A), is in the range of about 30 percent to about 50 percent of the cross-sectional area of the unthreaded section; the effective cooled area, referred to in (B), is in the range of about 70 percent to about 100 percent of the cross-sectional area of the unthreaded section; the ratio, referred to in (C), is in the range of greater than unity to about 2:1; and the ratio, referred to in (D), is in the range of about 0.2:1 to about 0.35:1.

* * * * *